Figure 1:
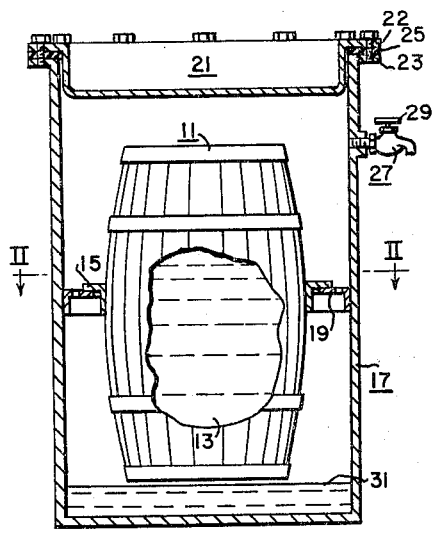

Sept. 26, 1961     Z. M. SHAPIRO     3,001,877

METHOD FOR AGING LIQUIDS

Filed Jan. 30, 1957

United States Patent Office 3,001,877
Patented Sept. 26, 1961

3,001,877
METHOD FOR AGING LIQUIDS
Zalman M. Shapiro, 5452 Bartlett St., Pittsburgh, Pa.
Filed Jan. 30, 1957, Ser. No. 637,200
3 Claims. (Cl. 99—48)

This invention relates to the art of storing liquids and has particular relationship to the storing and aging of alcoholic spirits such as whiskey. In its broader aspects this invention may also be applied to the storing and aging of wine.

It is the practice in the liquor industry to store alcoholic spirits such as whiskey for aging in new charred oak barrels during long time intervals. Such spirits when so stored customarily have an initial alcohol content of about 52% (104 to 105 proof) and after having been aged have an alcohol content of about 54½ to 57½% (109 to 115 proof). Although the aging process is not fully understood, it is thought that the aging is produced by the interaction of the spirits with the charred wood and the oxygen in the surrounding atmosphere.

The barrels are pervious to the vapor of the spirits and the vapor from the spirits tends to escape. The loss in spirits which thus results during the long interval (usually of several years) during which the spirits are aged is substantial, usually of the order of one-third of the initial content of the barrel. Attempts to prevent this loss by aging the spirits at a low temperature have not proved successful. At low temperatures the aging reaction is decelerated to such an extent that the aging time becomes excessively long. The coating of the barrels with an impervious material has also proved unsuccessful. It is thought that such a material prevents oxygen from penetrating to the spirits to produce the aging interaction and the spirits tend to leach out undesired products from the coating, or both.

It is accordingly an object of this invention to provide a method and apparatus for storing spirits for aging in such manner as to eliminate or substantially reduce the vapor loss during storing without affecting the aging interaction.

Attempts have also been made to accelerate the aging reaction. The aging reaction would be increased by increasing the temperature at which the spirits are stored for aging but this would increase the rate of evaporation of the spirits and cause increased loss.

It is another object of this invention to provide a method and apparatus for accelerating the aging of spirits without at the same time causing excessive loss.

In accordance with this invention the barrel in which the spirits is contained is maintained in a closed atmosphere containing vapors from the spirits at partial pressures substantially equal, or even higher than, the vapor tensions of the spirits. A reversible vaporizing reaction is thus set up at the surface of the spirits and vapor condenses on the surface at the same rate as it leaves the surface by vaporization. There is then substantially no vapor loss from the stored spirits.

In accordance with a further aspect of this invention, the temperature of the closed region in which the spirits are stored is maintained substantially above ambient. This accelerates the aging reaction. But the vaporization reaction remains reversible so that there is no loss of spirits by vaporization.

In accordance with a specific aspect of this invention air in the enclosed atmosphere is renewed at intervals, or continuously at a low rate such as not to affect the reversibility of the vaporization reaction. The oxygen necessary for aging may thus be replenished in accordance with this invention. The oxygen content in the closed region may also be set initially higher than that available in air, for example, at about 30% to eliminate the necessity of replenishment or to accelerate the reaction. Further, oxygen-content detectors may be provided to indicate when the oxygen content is low and requires replenishment.

Figure 2:
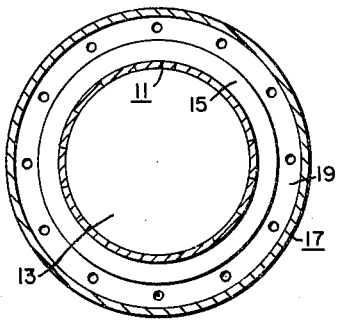

The novel features considered characteristic of this invention are disclosed generally above. The invention itself both as to its organization and as to its method of operation together with additional objects thereof will be understood from the following description of a specific embodiment when read in connection with the accompanying drawing, in which:

FIGURE 1 is a view in side elevation with parts broken away showing a preferred embodiment of this invention, and FIG. 2 is a view in section taken along line II—II of FIG. 1.

The apparatus shown in the drawing includes a barrel 11 usually new and of charred oak or like material which contains alcoholic spirits 13 such as whiskey. The barrel 11 is pervious to the vapor from the spirits 13. The barrel 11 is provided with a fin or flange 15 between its ends.

The apparatus also includes a container 17 of a material which is impervious to the vapor from the spirits. Typical materials of this type are mild steel, stainless steel or aluminum, but stainless steel and aluminum are preferred in accordance with a specific aspect of this invention. The container 17 is here shown as circularly cylindrical but may be of any convenient form as a rectangular parallelepiped or a cube for example. From the inner wall of the container 17 a shelf 19, in the specific structure shown a circular flange, extends. The barrel 11 is suspended by its fin 15 from the shelf 19. Both the fin 15 and the shelf 19 may be perforated.

The container 17 is provided with a top 21 from which a flange 22 extends. The flange 22 is securely bolted to a flange 23 extending from the upper rim of the container 17. Packing which may be in the form of a resilient ring (of rubber or neoprene for example) 25 or may be a plurality of O rings, in grooves (not shown) in the flange 22 and flange 23 is preferably provided between the flange 22 and the flange 23. The container 17 also includes a valve 27 having a stop cock 29 which may be opened or maintained open to allow access of air to the atmosphere within the container 17.

In accordance with a preferred specific aspect of this invention raw spirits 31 preferably at a higher concentration of alcohol than that in the barrel may be provided in the space between the barrel 11 and the container 17. The concentration of alcohol in the raw spirits may also be equal to or lower than the concentration in the barrel. Alcohol at 95% concentration or lower may also be used.

When a barrel 11 containing spirits 13 is mounted within container 17 and the top 21 is secured to the flange 23, the spirits 13 and liquid 31 if it is present initially vaporize filling the space between the container 17 and the barrel 11, the pores of the barrel 11 and any space between the spirits 13 and the barrel with spirits vapor, such as water vapor and alcohol vapor, at partial pressures substantially equal to the vapor tensions of the spirits. The vaporization of the spirits in the barrel is thus reversible and there is no loss of spirits. The alcohol content of the liquid 31 and the spirits 13 in the barrel tend to equalize.

The valve 27 may be opened at intervals to replenish the air in the container 17 to expedite any interaction between the spirits and oxygen and the charred barrel in the aging process. The valve 27 may also be maintained slightly open continuously for the same purpose. In the latter event so little air must trickle into the container 17 as not to materially reduce the partial pressures of the spirits vapors and affect the reversibility of the vaporization reactions. In accordance with a further specific aspect of the invention, the replenishment of air may take place at a substantial rate using up the liquid 31 which may be replaced from time to time. Since the liquid 31 is not in bond, it may be replaced at a low cost.

In accordance with a further aspect of this invention, the container 17 is maintained at an elevated temperature to accelerate the aging reaction.

While preferred embodiments of this invention have been disclosed herein, many modifications thereof are feasible. For example, the container 17 may include within it a plurality of barrels 13 rather than a single barrel or a container of a different kind (such as a plastic bag for example) may be used. The invention then is not to be restricted except insofar as is necessitated by the spirit of the prior art.

I claim as my invention:

1. The method of storing beverage spirits contained in a conventional aging barrel of a material, which soaks up the spirits and from the outer surface of which the spirits are evaporated, during long periods of time for aging purposes, the said method comprising confining said barrel in a sealed container of a material substantially impervious to said spirits with said barrel appreciably spaced from the inner wall of said container, thus maintaining said barrel in an aging atmosphere including the vapors of said spirits, said vapors being maintained continuously at partial pressures at least substantially equal to the vapor tensions of said spirits in said barrel so that the vaporization reaction at the surface of said barrel where said spirits tend to evaporate is reversible, and at intervals bleeding atmospheric air into said container to replenish the air in said atmosphere thereby to provide adequate oxygen for aging.

2. The method of storing beverage spirits contained in a conventional aging barrel of a material, which soaks up spirits and from the outer surface of which the spirits are evaporated, during long periods of time for aging purposes, the said method comprising confining said barrel in a sealed container of a material substantially impervious to said spirits, with said barrel appreciably spaced from the inner wall of said container, thus maintaining said barrel in an aging atmosphere including the vapors of said spirits, said vapors being maintained continuously at partial pressures at least substantially equal to the vapor tensions of said spirits which tend to evaporate from the outer surface of said barrel so that the vaporization reaction at the surface of said spirits is reversible, and maintaining the oxygen in said atmosphere enclosing said barrel adequate for aging.

3. The method of preventing excessive loss from beverage spirits stored for aging in a conventional aging barrel over long periods of time which comprises confining said barrel in a sealed enclosure and maintaining a body of spirits in the lower portion of said enclosure so that the vapors of said spirits are maintained over the surfaces from which said stored spirits tend to evaporate at vapor pressures substantially equal to the vapor tensions of said spirits at said surfaces whereby the vaporization reactions at said surfaces are reversible and substantial escape of said vapors from the regions of said spirits is prevented.

References Cited in the file of this patent

UNITED STATES PATENTS

| | | |
|---|---|---|
| 98,784 | Marland et al. | Jan. 11, 1870 |
| 102,806 | Gilman | May 10, 1870 |
| 144,103 | Jenkins | Oct. 28, 1873 |
| 196,094 | Johnson | Oct. 16, 1877 |
| 418,792 | Hasbrouck | Jan. 7, 1890 |
| 635,212 | Vogt | Oct. 17, 1899 |
| 926,324 | Handlan | June 29, 1909 |
| 2,865,770 | Nickol | Dec. 23, 1958 |